(12) United States Patent
Sakuta (10) Patent No.: US 9,702,425 B2
(45) Date of Patent: Jul. 11, 2017

(54) ROTARY DAMPER

(71) Applicant: KAYABA INDUSTRY CO., LTD., Tokyo (JP)

(72) Inventor: Atsushi Sakuta, Gifu (JP)

(73) Assignee: KYB Corporation, Tokyo (JP)

(*) Notice: Subject to any disclaimer, the term of this patent is extended or adjusted under 35 U.S.C. 154(b) by 0 days.

(21) Appl. No.: 14/382,790

(22) PCT Filed: Mar. 1, 2013

(86) PCT No.: PCT/JP2013/055641
§ 371 (c)(1),
(2) Date: Sep. 4, 2014

(87) PCT Pub. No.: WO2013/133155
PCT Pub. Date: Sep. 12, 2013

(65) Prior Publication Data
US 2015/0014105 A1    Jan. 15, 2015

(30) Foreign Application Priority Data
Mar. 5, 2012  (JP) ................................ 2012-047679

(51) Int. Cl.
*F16D 57/02* (2006.01)
*F16F 9/12* (2006.01)
(Continued)

(52) U.S. Cl.
CPC ................ *F16F 9/12* (2013.01); *F16F 9/145* (2013.01); *F16F 9/34* (2013.01); *F16F 9/348* (2013.01); *F16F 9/52* (2013.01)

(58) Field of Classification Search
CPC .................................. F16F 9/34; F16F 9/348
(Continued)

(56) References Cited

U.S. PATENT DOCUMENTS 3,038,561 A * 6/1962 Rumsey et al. ............... 188/278
2005/0263360 A1* 12/2005 Forster .......................... 188/308

FOREIGN PATENT DOCUMENTS

EP         2175159 A2    4/2010
JP         S64-12152 A   1/1989
(Continued)

OTHER PUBLICATIONS

Extended European Search Report dated Nov. 3, 2015.

*Primary Examiner* — Anna Momper
*Assistant Examiner* — Mahbubur Rashid
(74) *Attorney, Agent, or Firm* — Rabin & Berdo, P.C.

(57) ABSTRACT

A rotary damper includes: a shaft having a hollow portion; a pair of side panels; a case provided between the pair of side panels; a vane provided on the shaft so as to divide a first chamber and a second chamber; a liquid chamber defined within the hollow portion; a first partition wall and a second partition wall housed in the hollow portion; a first side valve chamber that is defined by the first partition wall; a second side valve chamber that is defined by the second partition wall; a first side port that connects the first side valve chamber to a second liquid chamber; a second side port that connects the second side valve chamber to the second liquid chamber; a first side damping valve capable of opening and closing the first side port; and a second side damping valve capable of opening and closing the second side port.

6 Claims, 2 Drawing Sheets

(51) Int. Cl.
    *F16F 9/52*         (2006.01)
    *F16F 9/14*         (2006.01)
    *F16F 9/34*         (2006.01)
    *F16F 9/348*       (2006.01)

(58) Field of Classification Search
    USPC .......................................... 188/296, 322.15
    See application file for complete search history.

(56) References Cited

FOREIGN PATENT DOCUMENTS

| | | | |
|---|---|---|---|
| JP | S64-17045 U | | 1/1989 |
| JP | H02-102035 U | | 8/1990 |
| JP | H02-102036 U | | 8/1990 |
| JP | 10009329 A | * | 1/1998 |
| JP | 10030671 A | * | 2/1998 |
| JP | H11-82593 A | | 3/1999 |
| JP | H11-101293 A | | 4/1999 |
| JP | H11-344066 A | | 12/1999 |

\* cited by examiner

ROTARY DAMPER

TECHNICAL FIELD

The present invention relates to an improvement in a rotary damper.

BACKGROUND ART

A rotary damper used in the related art includes a shaft, a pair of side panels that support the shaft rotatably, a case that is sandwiched between the pair of side panels such that an operating chamber is defined in an interior thereof, and a vane provided on the shaft so as to divide the operating chamber into a first chamber and a second chamber.

JP11-82593A and JP11-344066A, for example, disclose rotary dampers that operate when an external rotary force is exerted on the shaft, whereby the vane moves within the operating chamber in response to the rotation of the shaft, causing the first chamber to contract and the second chamber to expand. In these rotary dampers, a damping valve applies resistance to a flow of oil moving from the contracting first chamber to the expanding second chamber, and as a result, the rotation of the shaft is damped.

SUMMARY OF INVENTION

As described above, this type of rotary damper includes a damping valve that generates a damping force. In the rotary damper of JP11-82593A, two damping valves are disposed side by side in a lateral direction on a side of a case forming an operating chamber. In the rotary damper of JP11-344066A, two through holes are provided in a partition wall portion that partitions an operating chamber formed in a disc-shaped case, and corresponding damping valves are housed respectively in the through holes.

Since, in the rotary damper of JP11-82593A, the damping valves are provided on the side of the case, the rotary damper is large. Accordingly, a weight of the rotary damper increases, and as a result, it may be difficult to install the rotary damper in a damping subject such as a vehicle.

Further, in the rotary damper of JP11-344066A, the damping valves are provided in the partition wall portion partitioning the operating chamber in the case, and therefore a swingable range of the shaft is reduced. To secure a sufficient swingable range for the shaft, an outer diameter of the case must be increased, leading to an increase in the size of the rotary damper, similarly to the rotary damper of JP11-82593A. Accordingly, the weight of the rotary damper increases, and as a result, it may be difficult to install the rotary damper in a damping subject such as a vehicle.

The present invention has been designed in consideration of the problems described above, and an object thereof is to provide a small and lightweight rotary damper.

According to one aspect of this invention, a rotary damper includes: a shaft that is provided to be capable of rotating about a central axis and has a hollow portion in an interior thereof; a pair of side panels that support the shaft rotatably; a case provided between the pair of side panels such that an operating chamber is defined in an interior thereof; a vane provided on the shaft such that a tip end thereof slides against an inner periphery of the case, thereby dividing the operating chamber into a first chamber and a second chamber; a liquid chamber defined within the hollow portion; a first partition wall housed in the hollow portion so as to define the liquid chamber; a second partition wall housed in the hollow portion and provided at a remove from the first partition wall in an axial direction; a second liquid chamber that is defined in the hollow portion between the first partition wall and the second partition wall and communicates with the liquid chamber; a first side valve chamber that is defined in the hollow portion by the first partition wall and communicates with the first chamber; a second side valve chamber that is defined in the hollow portion by the second partition wall and communicates with the second chamber; a first side port provided in the first partition wall so as to connect the first side valve chamber to the second liquid chamber; a second side port provided in the second partition wall so as to connect the second side valve chamber to the second liquid chamber; a first side damping valve capable of opening and closing the first side port; and a second side damping valve capable of opening and closing the second side port.

The details as well as other features and advantages of this invention are set forth in the remainder of the specification and are shown in the accompanying drawings.

DESCRIPTION OF EMBODIMENTS

A rotary damper D according to an embodiment of the present invention will be described below with reference to the figures.

Figure 1:
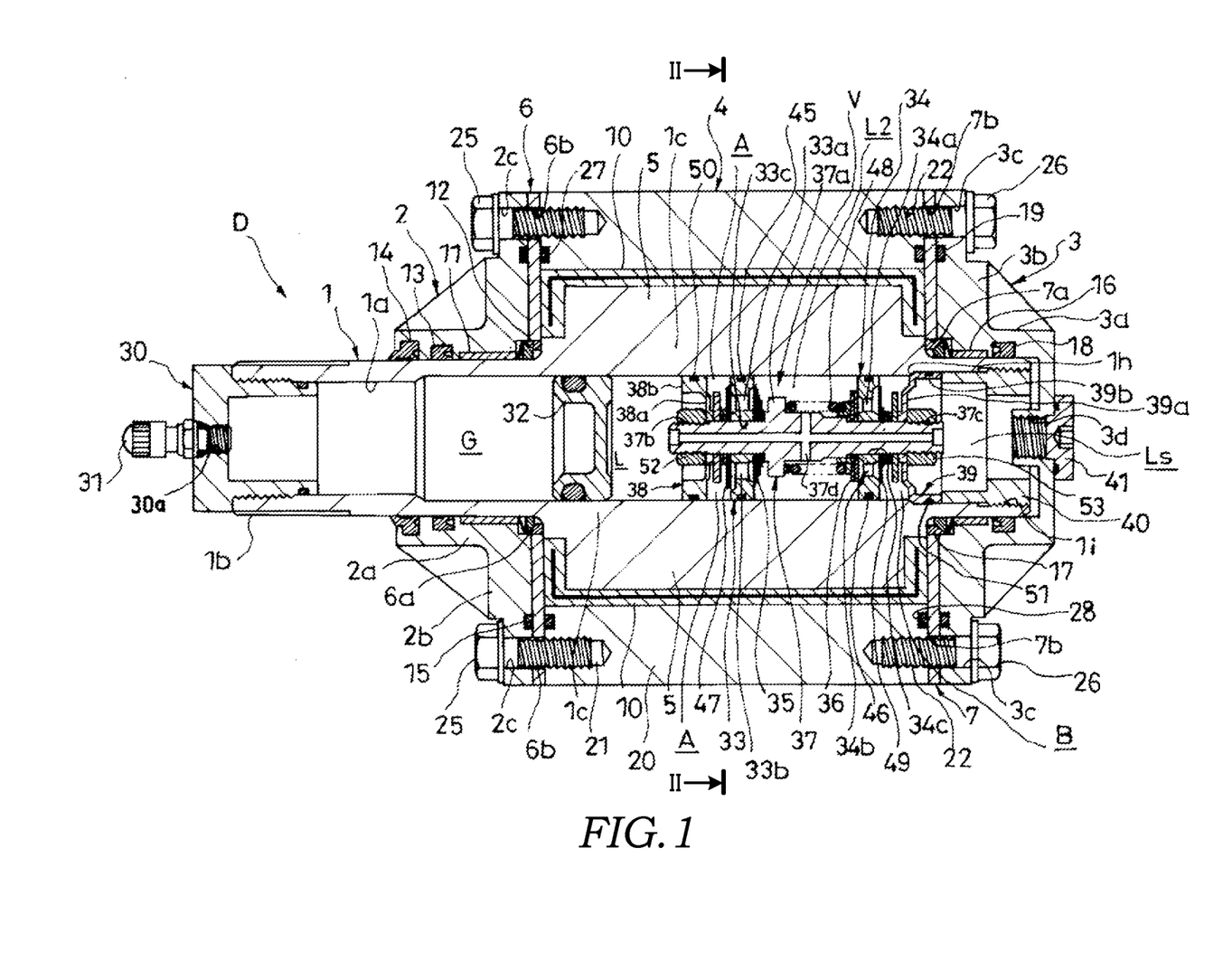
FIG. 1 is a longitudinal sectional view of a rotary damper according to an embodiment of the present invention.
Figure 2:
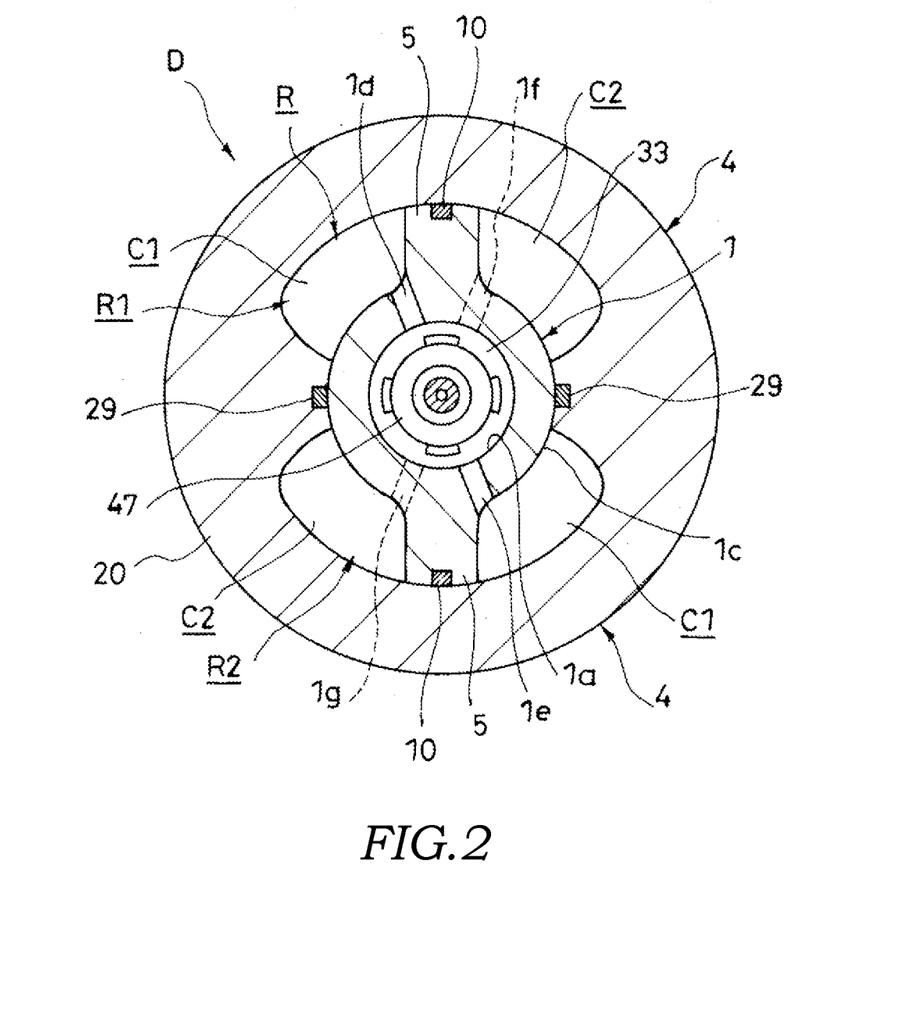
FIG. 2 is a II-II sectional view of FIG. 1.

As shown in FIGS. 1 and 2, the rotary damper D includes a shaft 1 capable of rotating about a central axis, a pair of side panels 2, 3 that support the shaft rotatably, a tubular case 4 provided between the pair of side panels 2, 3 such that an operating chamber R is defined in an interior thereof, vanes 5 provided on the shaft 1 such that respective tip ends thereof slide against an inner periphery of the case 4, thereby dividing the operating chamber R into a first chamber R1 and a second chamber R2, and a damping valve V provided in the shaft 1 to apply resistance to a flow of a fluid that travels between the first chamber R1 and the second chamber R2. When the shaft 1 is rotated in a circumferential direction relative to the case 4, the rotary damper D generates a damping force for damping the rotation of the shaft 1.

The shaft 1 is formed in a tubular shape having a hollow portion 1a in the interior thereof. The shaft 1 includes a serration 1b provided on a tip end outer periphery to enable the shaft 1 to be connected to a joint or the like (not shown), an enlarged diameter portion 1c formed with a larger outer diameter than other parts, the pair of vanes 5 formed on an outer periphery of the enlarged diameter portion 1c at intervals of 180 degrees in the circumferential direction, and four through holes 1d, 1e, 1f, 1g opened in side portions of the enlarged diameter portion 1c between the pair of vanes 5 so as to communicate with the hollow portion 1a.

The serration 1b is provided on the shaft 1 to enable connection to a joint or the like not shown in the figures, but the shaft 1 may be connected using another method. A step portion 1h is provided midway on a first end side (a right side in FIG. 1) of the shaft 1 such that an inner diameter of the hollow portion 1a is enlarged. A screw portion 1i is provided on an inner periphery of the hollow portion 1a at the first end of the shaft 1. A closed end cylinder-shaped cap 30 is screwed to a second end (a left end in FIG. 1) of the shaft 1.

The cap 30 closes the second end of the shaft 1. The cap 30 includes a screw hole 30a that penetrates a bottom portion thereof. A valve 31 is screwed into the screw hole 30a. A sliding partition wall 32 is inserted into the hollow portion 1a to be free to slide.

The sliding partition wall 32 defines a gas chamber G in the hollow portion 1a on the second end side (the left side in FIG. 1) of the sliding partition wall 32. As the sliding partition wall 32 moves through the hollow portion 1a in an axial direction (a left-right direction in FIG. 1), a capacity of the gas chamber G increases and decreases. A liquid chamber L is defined on the first end side (the right side in FIG. 1) of the sliding partition wall 32. The liquid chamber L can be pressurized by an internal pressure of the gas chamber G. The gas chamber G constitutes a pressurization mechanism. A gas can be charged into the gas chamber G from the outside via the valve 31. The internal pressure of the gas chamber G can thus be adjusted from the outside of the rotary damper D.

The damping valve V is housed in the hollow portion 1a on the first end side (the right side in FIG. 1) of the sliding partition wall 32. The damping valve V includes a first partition wall 33 and a second partition wall 34 housed in the hollow portion 1a, a first side port 33a provided in the first partition wall 33, a second side port 34a provided in the second partition wall 34, a first side damping valve 35 capable of opening and closing the first side port 33a, and a second side damping valve 36 capable of opening and closing the second side port 34a.

The first partition wall 33 and the second partition wall 34 define a second liquid chamber L2 that communicates with the liquid chamber L within the hollow portion 1a. Further, the first partition wall 33 defines the second liquid chamber L2 and a first side valve chamber A formed in the hollow portion 1a on an opposite side to the second liquid chamber L2, while the second partition wall 34 defines the second liquid chamber L2 and a second side valve chamber B formed in the hollow portion 1a on an opposite side to the second liquid chamber L2.

The first partition wall 33, the second partition wall 34, the first side damping valve 35, and the second side damping valve 36 are attached to an outer periphery of a rod 37. These respective members are integrated by the rod 37.

A partitioning member 38 that is fitted to the inner periphery of the hollow portion 1a and a holder member 39 for fixing the damping valve V in a predetermined position within the hollow portion 1a are attached to the rod 37.

The second end side (the left side in FIG. 1) of the partitioning member 38 in the hollow portion 1a is divided by the sliding partition wall 32 into the liquid chamber L and the gas chamber G. In the hollow portion 1a, the first side valve chamber A is formed between the partitioning member 38 and the first partition wall 33, and the second side valve chamber B is formed between the holder member 39 and the second partition wall 34. The first side valve chamber A communicates with the first chamber R1 through the through holes 1d, 1e. The second side valve chamber B communicates with the second chamber R2 through the through holes 1f, 1g.

The first partition wall 33 is formed in a disc shape. The first partition wall 33 includes the first side port 33a and a check port 33b that connect the first side valve chamber A to the second liquid chamber L2, and an insertion hole 33c into which the rod 37 is inserted. A seal ring 45 is attached to an outer periphery of the first partition wall 33 and fitted tightly to the inner periphery of the hollow portion 1a to prevent the first side valve chamber A and the second liquid chamber L2 from communicating via the outer periphery of the first partition wall 33.

The second partition wall 34 is formed in a disc shape. The second partition wall 34 includes the second side port 34a and a check port 34b that connect the second side valve chamber B to the second liquid chamber L2, and an insertion hole 34c into which the rod 37 is inserted. A seal ring 46 is attached to an outer periphery of the second partition wall 34 and fitted tightly to the inner periphery of the hollow portion 1a to prevent the second side valve chamber B and the second liquid chamber L2 from communicating via the outer periphery of the second partition wall 34.

An annular leaf valve serving as the first side damping valve 35 is provided in laminated fashion on the second liquid chamber L2 side of the first partition wall 33. The first side damping valve 35 is attached to the outer periphery of the rod 37 so as to close an opening on the first end side (the right side in FIG. 1) of the first side port 33a.

An inner periphery of the first side damping valve 35 is fixed to the outer periphery of the rod 37 such that deflection of an outer periphery thereof is permitted. When a pressure in the first side valve chamber A exceeds a pressure in the second liquid chamber L2 such that a differential pressure between the two reaches a valve opening pressure, the first side damping valve 35 deflects, thereby opening the first side port 33a so that fluid can pass through while applying resistance to a flow of the fluid.

An annular check valve 47 is provided in laminated fashion on the first side valve chamber A side of the first partition wall 33. The check valve 47 is attached to the outer periphery of the rod 37 so as to close an opening on the second end side (the left side in FIG. 1) of the check port 33b.

An inner periphery of the check valve 47 is fixed to the outer periphery of the rod 37 such that deflection of an outer periphery thereof is permitted. When the pressure in the second liquid chamber L2 exceeds the pressure in the first side valve chamber A, the check valve 47 deflects, thereby opening the check port 33b so that fluid can pass through. The check valve 47 is formed to apply substantially no resistance to the flow of the fluid passing through.

When the pressure in the first side valve chamber A falls below the pressure in the second liquid chamber L2, the first side damping valve 35 is pressed against the first partition wall 33 so as to close the first side port 33a. Hence, the first side port 33a is a one-way port that allows the fluid to flow only from the first side valve chamber A toward the second liquid chamber L2 in accordance with the first side damping valve 35.

An annular leaf valve serving as the second side damping valve 36 is provided in laminated fashion on the second liquid chamber L2 side of the second partition wall 34. The second side damping valve 36 is attached to the outer periphery of the rod 37 so as to close an opening on the second end side (the left side in FIG. 1) of the second side port 34a. An inner peripheral side of the second side damping valve 36 is fixed to the outer periphery of the rod 37 such that deflection of an outer periphery thereof is permitted. Further, an initial load is exerted on the second side damping valve 36 by a coil spring 48 disposed on the outer periphery of the rod 37.

When a pressure in the second side valve chamber B exceeds the pressure in the second liquid chamber L2 such that a differential pressure between the two reaches a valve opening pressure, the second side damping valve 36 deflects, thereby opening the second side port 34a so that fluid can pass through while applying resistance to the flow of the fluid. The valve opening pressure of the second side damping valve 36 can be modified by exchanging the coil spring 48 or the like in order to adjust a biasing force pressing against the second side damping valve 36.

When the pressure in the second side valve chamber B falls below the pressure in the second liquid chamber L2, the second side damping valve 36 is pressed against the second partition wall 34 so as to close the second side port 34*a*. Hence, the second side port 34*a* is a one-way port that allows the fluid to flow only from the second side valve chamber B toward the second liquid chamber L2 in accordance with the second side damping valve 36.

An annular check valve 49 is provided in laminated fashion on the second side valve chamber B side of the second partition wall 34. The check valve 49 is attached to the outer periphery of the rod 37 so as to close an opening on the first end side (the right side in FIG. 1) of the check port 34*b*.

An inner periphery of the check valve 49 is fixed to the outer periphery of the rod 37 such that deflection of an outer periphery thereof is permitted. When the pressure in the second liquid chamber L2 exceeds the pressure in the second side valve chamber B, the check valve 49 deflects, thereby opening the check port 34*b* so that fluid can pass through. The check valve 49 is formed to apply substantially no resistance to the flow of the fluid passing through.

In this embodiment, the coil spring 48 is provided only on the second side damping valve 36 to bias the second side damping valve 36, but the present invention is not limited thereto, and the first side damping valve 35 may also be biased by a coil spring. Further, the inner periphery of the second side damping valve 36 is fixed to the rod 37 in the axial direction, but the second side damping valve 36 may be attached to the rod 37 to be capable of moving in the axial direction. In this case, the second side damping valve 36 slides up the rod 37 in a direction heading away from the second partition wall 34 in response to a pressure increase following valve opening, and as a result, the second side port 34*a* opens widely. The first side damping valve 35 may be configured similarly.

It should be noted that the first side damping valve 35 and the second side damping valve 36 are both laminated leaf valves formed by laminating a plurality of annular plates. The number of annular plates is arbitrary, and depending on a desired damping characteristic of the rotary damper D, the first side damping valve 35 and the second side damping valve 36 may be constituted by leaf valves formed using only one annular plate.

Further, the first side damping valve 35 and the second side damping valve 36 may be valve bodies other than leaf valves. For example, valve bodies such as poppet valves or needle valves may be used. Furthermore, the damping valve V may be a valve that does not require a valve body, such as an orifice or a choke. By forming the first side damping valve 35 and the second side damping valve 36 from leaf valves, however, an overall length of the damping valve V can be shortened in comparison with a case where valve bodies such as poppet valves or needle valves are used. Moreover, by modifying the plate thickness or number of the laminated annular plates constituting the leaf valves, the damping characteristic of the rotary damper D can be tuned easily.

The partitioning member 38 includes a disc shaped partition plate 38*a* having a hole, which is attached to the outer periphery of the rod 37, and an annular fitting portion 38*b* that is provided on an outer periphery of the partition plate 38*a* and fitted to the inner periphery of the hollow portion 1*a*. A seal ring 50 is attached to an outer periphery of the partitioning member 38 and fitted tightly to the inner periphery of the hollow portion 1*a* to prevent the first side valve chamber A and the liquid chamber L from communicating via the outer periphery of the partitioning member 38.

The holder member 39 is formed in an annular shape. The holder member 39 includes an annular portion 39*a* attached to the outer periphery of the rod 37, and a fitting portion 39*b* provided on an outer periphery of the annular portion 39*a* and fitted to the inner periphery of the hollow portion 1*a*. A seal ring 51 is attached to an outer periphery of the fitting portion 39*b* of the holder member 39 to prevent the second side valve chamber B and the first end side (the right side in FIG. 1) of the holder member 39 in the hollow portion 1*a* from communicating via the outer periphery of the holder member 39.

The rod 37 is formed in a tubular shape having an intermediate flange 37*a*. Screw portions 37*b*, 37*c* are provided on the outer periphery of the rod 37 on a tip end and a base end, respectively. The first side damping valve 35, the first partition wall 33, the check valve 47, and the partitioning member 38 are fitted in that order to the outer periphery of the rod 37 on the second end side (the left side in FIG. 1) of the flange 37*a*. When a nut 52 is screwed to the screw portion 37*b* of the rod 37, the first side damping valve 35, the first partition wall 33, the check valve 47, and the partitioning member 38 are fixed to the second end side (the left side in FIG. 1) of the rod 37.

The coil spring 48, the second side damping valve 36, the second partition wall 34, the check valve 49, and the holder member 39 are fitted in that order to the outer periphery of the rod 37 on the first end side (the right side in FIG. 1) of the flange 37*a*. When a nut 53 is screwed to the screw portion 37*c*, the coil spring 48, the second side damping valve 36, the second partition wall 34, the check valve 49, and the holder member 39 are fixed to the first end side (the right side in FIG. 1) of the rod 37. The flange 37*a* doubles as a spring bearing that supports the second side (the left side in FIG. 1) of the coil spring 48. The coil spring 48 is interposed between the flange 37*a* and the second side damping valve 36 in a compressed condition. The biasing force of the coil spring 48 acts on the second side damping valve 36.

Hence, the constituent members of the damping valve V are fixed to the rod 37 to form an assembly. The base end of the rod 37 is then inserted into the hollow portion 1*a* from the first end side (the right side in FIG. 1) of the hollow portion 1*a* and pressed into the hollow portion 1*a* until the second end (the left end in FIG. 1) of the fitting portion 39*b* of the holder member 39 contacts the step portion 1*h* of the hollow portion 1*a*. Once the damping valve V assembly has been housed in the hollow portion 1*a* in this manner, an outer peripheral screw nut 40 is screwed to the screw portion 1*i* provided on the right end of the hollow portion 1*a*, whereby the fitting portion 39*b* of the holder member 39 is sandwiched between the outer peripheral screw nut 40 and the step portion 1*h*. As a result, the holder member 39 is fixed to the shaft 1.

When the holder member 39 is fixed to the shaft 1, the holder member 39 holds the rod 37. As a result, the constituent members of the damping valve V and the partitioning member 38 are fixed to the shaft 1. Further, the rod 37 is formed in a tubular shape, and a lateral hole 37*d* is formed in an outer periphery of the flange 37*a* to communicate with the interior. As a result, the liquid chamber L communicates with the second liquid chamber L2 and a space in the hollow portion 1a to the right of the holder member 39 via the interior of the rod 37.

The side panel 2 is attached to the case 4 via a disc-shaped plate 6 so as to close the second end (the left end in FIG. 1) of the case 4. The side panel 2 includes a shaft holding portion 2a formed in a tubular shape and penetrated by the second end side (the left side in FIG. 1) of the shaft 1, a flange portion 2b provided on an outer periphery of the first end (the right end in FIG. 1) of the shaft holding portion 2a, and a plurality of bolt insertion holes 2c provided in the flange portion 2b at intervals on an identical circumference. A tubular bearing 11 that slides against the outer periphery of the second end side (the left side in FIG. 1) of the shaft 1 is attached to an inner periphery of the shaft holding portion 2a. Annular U packing 13 that slides against the outer periphery of the shaft 1 and an annular dust seal 14 are attached respectively to the inner periphery of the shaft holding portion 2a on the second end side (the left side in FIG. 1) of the bearing 11.

The U packing 13 is fitted tightly to the outer periphery of the shaft 1 so as to form a seal between the shaft 1 and the side panel 2. The dust seal 14 prevents dirt and dust from the outside from entering between the shaft 1 and the side panel 2. An O ring 15 is attached to the case 4 side of the flange portion 2b. The O ring 15 is tightly fitted to the plate 6 to form a seal between the side panel 2 and the plate 6.

The side panel 3 is attached to the case 4 via a disc-shaped plate 7 so as to close the first end (the right end in FIG. 1) of the case 4. The side panel 3 includes a recessed shaft holding portion 3a into which the first end (the right end in FIG. 1) of the shaft 1 is inserted, a flange portion 3b provided on an outer periphery, a plurality of bolt insertion holes 3c provided in the flange portion 3b at intervals on an identical circumference, and a fluid injection port 3d penetrating a bottom portion of the shaft holding portion 3a. A plug 41 that closes the fluid injection port 3d is screwed to the fluid injection port 3d.

The side panel 3 closes an open end on the first end (the right end in FIG. 1) of the shaft 1. The side panel 3 closes a space in the hollow portion 1a on the first end side (the right side in FIG. 1) of the holder member 39. This space communicates with the liquid chamber L and the second liquid chamber L2 via the interior of the rod 37. When closed by the side panel 3, this space functions as an auxiliary liquid chamber Ls.

It should be noted that the second liquid chamber L2 communicates with the first chamber R1 via the first side port 33a, the check port 33b, the first side valve chamber A, and the through holes 1d, 1e, and communicates with the second chamber R2 via the second side port 34a, the check port 34b, the second side valve chamber B, and the through holes 1f, 1g. The auxiliary chamber Ls therefore communicates with both the first chamber R1 and the second chamber R2.

The auxiliary liquid chamber Ls communicates with the outside of the rotary damper D via the fluid injection port 3d. By injecting fluid from the outside of the rotary damper D into the fluid injection port 3d with the first end (the right end in FIG. 1) of the rotary damper D oriented upward such that the fluid injection port 3d is oriented upward, the fluid can be charged into the auxiliary liquid chamber Ls and respective interiors of the liquid chamber L, the second liquid chamber L2, the first chamber R1, and the second chamber R2 communicating therewith without intermixing with gas. Fluid can therefore be injected into the rotary damper D extremely easily. Further, when the fluid is discharged, the fluid can be discharged through the fluid injection port 3d similarly. As a result, the fluid in the rotary damper D can also be replaced easily.

A tubular bearing 16 that slides against the outer periphery of the first end side (the right side in FIG. 1) of the shaft 1 is attached to an inner periphery of the shaft holding portion 3a. Annular U packing 18 that slides against the outer periphery of the shaft 1 is attached to the inner periphery of the shaft holding portion 3a on the first end side (the right side in FIG. 1) of the bearing 16. Since the shaft holding portion 3a is not open to the outside, the side panel 3 is not provided with a dust seal. However, in a case where the second end of the shaft 1 projects to the outside such that the shaft holding portion 3a is open to the outside, a dust seal may be provided.

An O ring 19 is attached to the case 4 side of the side panel 3. The O ring 19 forms a seal between the side panel 3 and the plate 7. The side panels 2, 3 are formed from a lightweight material such as aluminum, for example. An overall weight of the rotary damper D is thus reduced.

The plates 6, 7 are formed in a disc shape to be thinner than the side panels 2, 3. The plates 6, 7 respectively include shaft insertion holes 6a, 7a formed centrally and penetrated by the shaft 1, and pluralities of bolt insertion holes 6b, 7b provided in positions aligning with the respective bolt insertion holes 2c, 3c formed in the side panels 2, 3. The plates 6, 7 are provided to slide against the vanes 5, thereby protecting the side panels 2, 3.

To secure wear resistance on the plates 6, 7, respective vane 5 side surfaces of the plates 6, 7 are preferably formed from a material exhibiting superior wear resistance. More specifically, for example, the plates 6, 7 may be formed entirely from a material having high hardness. Further, the wear resistance of the respective surfaces (sliding surfaces) of the plates 6, 7 that contact the vanes 5 may be increased by forming plating or a diamond-like carbon film on the surfaces or implementing gas nitrocarburizing processing, thermal processing, or silicon attachment processing on the surfaces. It should be noted that the plates 6, 7 may be omitted, and instead, the side panels 2, 3 may be attached directly to the case 4.

The case 4 includes a main body 20 formed in a tubular shape such that the operating chamber R is defined in an interior thereof, a plurality of screw holes 21 provided in the second end side (the left side in FIG. 1) of the main body 20 in alignment with the respective bolt insertion holes 2c of the side panel 2, and a plurality of screw holes 22 provided in the first end side (the right side in FIG. 1) of the main body 20 in alignment with the respective bolt insertion holes 3c of the side panel 3.

The plate 6 and the side panel 2 are attached in that order to the second end side of the case 4. The plate 6 and the side panel 2 are integrated with the case 4 by screwing bolts 25 inserted into the bolt insertion holes 2c, 6b to the screw holes 21. The plate 7 and the side panel 3 are attached in that order to the first end side of the case 4. The plate 7 and the side panel 3 are integrated with the case 4 by screwing bolts 26 inserted into the bolt insertion holes 3c, 7b to the screw holes 22. The bolts 25, 26 may be used in numbers required to secure sufficient strength. The bolt insertion holes 2c, 3c, 6b, 7b and the screw holes 21, 22 are therefore provided in accordance with the numbers of bolts 25, 26 required to secure sufficient strength.

When the shaft 1 is inserted into the case 4 and the plates 6, 7 and the side panels 2, 3 are attached to the case 4 in the manner described above, the interior of the case 4 is airtight. At this time, two fan-shaped operating chambers R are formed in the case 4. The tip ends of the vanes 5 slide against the inner periphery of the case 4. The two operating chambers R are each divided into a chamber C1 and a chamber C2 by the vanes 5. A fluid such as working oil, for example, is sealed into the chambers C1 and the chambers C2. O rings 27, 28 surrounding respective outer peripheries of the operating chambers R are attached to the respective ends (the left and right ends in FIG. 1) of the main body 20 of the case 4. The O rings 27, 28 form seals between the case 4 and the plates 6, 7. As a result, the operating chambers R are airtight.

The chambers C1 are defined on the first end side (an upper left side and a lower right side in FIG. 2) of the pair of vanes 5, while the chambers C2 are defined on the second end side (an upper right side and a lower left side in FIG. 2) of the vanes 5. When the shaft 1 rotates clockwise in FIG. 2, the chambers C1 are caused to expand and the chambers C2 are caused to contract by the vanes 5. When the shaft 1 rotates counterclockwise in FIG. 2, on the other hand, the chambers C1 are caused to contract and the chambers C2 are caused to expand by the vanes 5.

The chambers C1 that are caused to expand or contract in volume as the shaft 1 rotates communicate with each other via the through holes 1d, 1e in the shaft 1 and the first side valve chamber A to form the first chamber R1. Similarly, the chambers C2 that are caused to expand or contract in volume as the shaft 1 rotates communicate with each other via the through holes 1f, 1g in the shaft 1 and the second side valve chamber B to form the second chamber R2. The first chamber R1 and the second chamber R2 are defined by the vanes 5. The through holes 1d, 1e are opened in respective bases of the vanes 5 so that the chambers C1 are maintained in a communicative condition with each other even when the shaft 1 rotates. The through holes 1f, 1g are likewise opened in the respective bases of the vanes 5 so that the chambers C2 are maintained in a communicative condition with each other even when the shaft 1 rotates.

The vanes 5 each have an arc-shaped surface on the tip end thereof. A U-shaped seal 10 is attached to each vane 5 from the second end (the left end in FIG. 1) on the side panel 2 side to the tip end and the first end (the right end in FIG. 1) on the side panel 3 side. The seals 10 slide against an inner peripheral surface of the case 4 and end surfaces of the plates 6, 7 so as to form seals between the vanes 5 and the case 4 and between the vanes 5 and the plates 6, 7.

Further, a U-shaped seal 29 is attached to the inner periphery of the main body 20 from a part that slides against the outer periphery of the enlarged diameter portion 1c of the shaft 1 to the respective ends (the left and right ends in FIG. 1) of the main body 20. A side seal 12 that slides against both a side wall of the shaft insertion hole 6a and the enlarged diameter portion 1c of the shaft 1 so as to form a seal between the plate 6 and the shaft 1 is provided on an inner periphery of the plate 6. A side seal 17 that slides against both a side wall of the shaft insertion hole 7a and the enlarged diameter portion 1c of the shaft 1 so as to form a seal between the plate 7 and the shaft 1 is provided on an inner periphery of the plate 7. The first chamber R1 and the second chamber R2 are sealed by the seal 29, the seal 10, the side seals 12, 17, and the O rings 27, 28 so as not to communicate with each other without passing through the damping valve V.

By providing the fluid injection port 3d, fluid can be injected into the rotary damper D. However, by providing an injection port that communicates with the first chamber R1 and an injection port that communicates with the second chamber R2 in the case 4, fluid may be injected directly into the first chamber R1 and the second chamber R2.

An operation of the rotary damper D will be described below.

When the shaft 1 rotates counterclockwise in FIG. 2 such that the vanes 5 cause the first chamber R1 to contract, the pressure in the first chamber R1 increases, causing the first side damping valve 35 to deflect such that the first side port 33a opens. Fluid pushed out of the first chamber R1 as a result flows into the second liquid chamber L2 through the first side valve chamber A and the first side port 33a. Further, the fluid pushes open the check valve 49 so as to flow into the second chamber R2 through the check port 34b and the second side valve chamber B. As the fluid passes through the first side port 33a, resistance is applied to the flow of the fluid by the first side damping valve 35 such that a difference in pressure arises between the first chamber R1 and the second chamber R2. As a result, the rotary damper D generates a damping force for damping the rotation of the shaft 1.

When the shaft 1 rotates clockwise in FIG. 2, on the other hand, such that the vanes 5 cause the second chamber R2 to contract, the pressure in the second chamber R2 increases. As a result, a force pushing the second side damping valve 36 toward the second liquid chamber L2 increases, and when this force overcomes the biasing force of the coil spring 48, the coil spring 48 is compressed, causing the second side damping valve 36 to deflect such that the second side port 34a opens. Fluid pushed out of the second chamber R2 as a result flows into the second liquid chamber L2 through the second side valve chamber B and the second side port 34a. Further, the fluid pushes open the check valve 47 so as to flow into the first chamber R1 through the check port 33b and the first side valve chamber A. As the fluid passes through the second side port 34a, resistance is applied to the flow of the fluid by the second side damping valve 36 such that a difference in pressure arises between the second chamber R2 and the first chamber R1. As a result, the rotary damper D generates a damping force for damping the rotation of the shaft 1.

Further, when a volume of the fluid in the rotary damper D varies due to temperature variation in the fluid, the sliding partition wall 32 moves in the axial direction through the hollow portion 1a, thereby increasing or reducing the capacity of the gas chamber G. As a result, the volume variation in the fluid is compensated for.

More specifically, when volume variation occurs in the fluid, the amount of fluid in the first chamber R1, the second chamber R2, the first side valve chamber A, and the second side valve chamber B becomes either excessive or insufficient in accordance with the volume variation. Therefore, the sliding partition wall 32 moves through the hollow portion 1a by an amount corresponding to the volume variation. Hence, when the fluid is excessive, the excess fluid is discharged into the liquid chamber L from the first chamber R1, the second chamber R2, the first side valve chamber A, and the second side valve chamber B via the second liquid chamber L2, and when the fluid is insufficient, an amount of fluid corresponding to the deficiency is supplied to the first chamber R1, the second chamber R2, the first side valve chamber A, and the second side valve chamber B from the liquid chamber L. A pressure in the gas chamber G propagates to the first chamber R1, the second chamber R2, the first side valve chamber A, and the second side valve chamber B via the liquid chamber L. Therefore, by increasing the pressure in the gas chamber G, an apparent stiffness of the fluid increases, and as a result, the rotary damper D can generate the damping force with favorable responsiveness.

As described above, the rotary damper D generates the damping force for damping the rotation of the shaft 1 as the shaft 1 rotates. In the rotary damper D, the first side damping valve 35 that applies resistance to a flow of the fluid traveling from the first chamber R1 to the second chamber R2 and the second side damping valve 36 that applies resistance to a flow of the fluid traveling from the second chamber R2 to the first chamber R1 are provided in the shaft 1. Hence, there is no need to provide the damping valves 35, 36 on the side of the case 4 or in locations that affect a swingable range of the shaft 1, and therefore the rotary damper D can be reduced in size and weight.

Further, the first side damping valve 35 and the second side damping valve 36 are provided in the interior of the shaft 1, which is conventionally a dead space, and therefore the outer diameter and length of the shaft 1 are not affected even when valves having a complicated structure are used as the first side damping valve 35 and the second side damping valve 36. As a result, a required damping characteristic can be realized without increasing the size of the rotary damper D.

The hollow portion 1a is formed in the shaft 1, and the first side damping valve 35 and second side damping valve 36 are housed in the hollow portion 1a. A damping force generation source for generating the damping force is switched between the first side damping valve 35 and the second side damping valve 36 in accordance with the rotation direction of the shaft 1, and therefore an optimum damping force can be generated in accordance with the rotation direction of the rotary damper D.

Moreover, in the rotary damper, the second liquid chamber L2 communicating with the liquid chamber L is provided between the first partition wall 33 and the second partition wall 34. Hence, the second liquid chamber L2 is disposed on a downstream side of the first side damping valve 35 and the second side damping valve 36 regardless of the rotation direction of the shaft 1, and therefore a pressure increase in the contraction side chamber, from among the first chamber R1 and the second chamber R2, is not obstructed. As a result, the rotary damper D can generate a stable damping force.

Further, the liquid chamber L and the gas chamber G are provided in the shaft 1. There is therefore no need to provide the liquid chamber L and the gas chamber G on the side of the case 4 or in locations that affect the swingable range of the shaft 1. As a result, the rotary damper D can be further reduced in size.

The pressurization mechanism is not limited to the configuration described above, and instead of the configuration in which the gas chamber G is defined by the sliding partition wall 32, the liquid chamber L and the gas chamber G may be defined by providing a diaphragm or a bladder in the hollow portion 1a. Moreover, a gas chamber may be formed and used as the pressurization mechanism by housing a diaphragm or a bladder in the interior of the first chamber R1 or the second chamber R2 instead of the interior of the hollow portion 1a.

The first side damping valve 35 and the second side damping valve 36 are constituted by annular leaf valves, and the first side damping valve 35 and second side damping valve 36 are attached to the outer periphery of the rod 37 penetrating the first partition wall 33 and the second partition wall 34 so as to be fixed to the first partition wall 33 and second partition wall 34. By assembling the respective members constituting the damping valve V in this manner, an operation to house the first side damping valve 35 and the second side damping valve 36 in the hollow portion 1a of the shaft 1 can be performed easily.

Moreover, the rotary damper D includes the partitioning member 38 provided on the base end of the rod 37 and inserted into the hollow portion 1a to partition the liquid chamber L from the first side valve chamber A, and the holder member 39 that holds the rod 37 and seals the second side valve chamber B. The holder member 39 includes the annular portion 39a attached to the outer periphery of the rod 37, and the fitting portion 39b provided on the outer periphery of the annular portion 39a and fitted to the inner periphery of the hollow portion 1a. The step portion 1h is provided on the inner periphery of the hollow portion 1a. The fitting portion 39b is sandwiched between the step portion 1h and the outer peripheral screw nut 40 screwed to the inner periphery of the hollow portion 1a, whereby the holder member 39 is fixed to the interior of the shaft 1. As a result, a load of the outer periphery screw nut 40 pressing against the holder member 39 does not act on the rod 37 integrating the first partition wall 33 and second partition wall 34, and the first side damping valve 35 and second side damping valve 36 laminated respectively thereon. Hence, according to the rotary damper D, a desired damping characteristic can be realized.

The rod 37 is formed in a tubular shape so that the fluid can be injected into the liquid chamber L, the second liquid chamber L2, the first chamber R1, and the second chamber R2 from the outside of the holder member 39. Hence, according to the rotary damper D, a fluid injection operation is extremely easy.

The hollow portion 1a opens onto at least one end of the shaft 1, and this end is covered by the side panel 3 such that the auxiliary liquid chamber Ls is formed between the holder member 39 and the side panel 3 so as to communicate with the liquid chamber L. By having the auxiliary liquid chamber Ls function as a liquid chamber in addition to the liquid chamber L in this manner, a sufficient liquid chamber capacity can be secured. Further, a correspondingly sufficient capacity can be secured in the gas chamber G, enabling a reduction in pressure variation in the gas chamber G due to volume variation in the fluid. Hence, according to the rotary damper D, an amount of variation in the damping characteristic due to temperature variation can be reduced.

According to the embodiment described above, a following effect is obtained.

The rotary damper D generates the damping force for damping the rotation of the shaft 1 as the shaft 1 rotates. In the rotary damper D, the first side damping valve and the second side damping valve that apply resistance to the flow of the fluid traveling between the first chamber R1 and the second chamber R2 are provided in the shaft. Hence, there is no need to provide the first side damping valve and the second side damping valve on the side of the case or in locations that affect the swingable range of the shaft. As a result, the rotary damper D can be reduced in size and weight.

Embodiments of this invention were described above, but the above embodiments are merely examples of applications of this invention, and the technical scope of this invention is not limited to the specific constitutions of the above embodiments.

This application claims priority based on Japanese Patent Application No. 2012-047679 filed with the Japan Patent Office on Mar. 5, 2012, the entire contents of which are incorporated into this specification.

The embodiments of this invention in which an exclusive property or privilege is claimed are defined as follows:

1. A rotary damper, comprising:
   a shaft that is provided to be capable of rotating about a central axis and has a hollow portion in an interior thereof;
   a pair of side panels that support the shaft rotatably;
   a case provided between the pair of side panels such that an operating chamber is defined in an interior thereof;

a vane provided on the shaft such that a tip end thereof slides against an inner periphery of the case, thereby dividing the operating chamber into a first chamber and a second chamber;

a liquid chamber defined within the hollow portion;

a partitioning member housed in the hollow portion and defining the liquid chamber, the partitioning member having an outer periphery in contact with an inner periphery of the hollow portion;

a first partition wall housed in the hollow portion and being separated from the partitioning member in an axial direction;

a second partition wall housed in the hollow portion and being separated from the first partition wall in the axial direction;

a first side valve chamber that is defined in the hollow portion between the first partition wall and the partitioning member, and communicates with the first chamber;

a second liquid chamber that is defined in the hollow portion between the first partition wall and the second partition wall, and in constant communication with the liquid chamber;

a second side valve chamber that is defined in the hollow portion by the second partition wall, and communicates with the second chamber;

a first side port provided in the first partition wall and connecting the first side valve chamber to the second liquid chamber;

a second side port provided in the second partition wall and connecting the second side valve chamber to the second liquid chamber;

a first side damping valve capable of opening and closing the first side port; and a second side damping value capable of opening and closing the second side port.

2. The rotary damper as defined in claim 1, wherein the liquid chamber and a pressurization mechanism that is configured to pressurize the liquid chamber are provided in the shaft.

3. The rotary damper as defined in claim 1, wherein the first side damping valve and the second side damping valve are annular leaf valves that are attached to an outer periphery of a rod penetrating the first partition wall and the second partition wall, and are fixed to the first partition wall and the second partition wall, respectively.

4. The rotary damper as defined in claim 3, further comprising:

a holder member that holds the rod and closes the second side valve chamber; and an outer peripheral screw nut that is screwed to an inner periphery of the hollow portion and fixes the holder member to the hollow portion, wherein a step portion is provided on the inner periphery of the hollow portion, the holder member includes
  an annular portion attached to the outer periphery of the rod, and
  a fitting portion provided on an outer periphery of the annular portion and fitted to the hollow portion, and the outer peripheral screw nut sandwiches the fitting portion of the holder member together with the step portion such that the fitting portion is fixed to the hollow portion.

5. A rotary damper, comprising:

a shaft that is provided to be capable of rotating about a central axis and has a hollow portion in an interior thereof;

a pair of side panels that support the shaft rotatably;

a case provided between the pair of side panels such that an operating chamber is defined in an interior thereof;

a vane provided on the shaft such that a tip end thereof slides against an inner periphery of the case, thereby dividing the operating chamber into a first chamber and a second chamber;

a liquid chamber defined within the hollow portion;

a partitioning member housed in the hollow portion and defining the liquid chamber, the partitioning member having an outer periphery in contact with an inner periphery of the hollow portion;

a first partition wall housed in the hollow portion and being separated from the partitioning member in an axial direction;

a second partition wall housed in the hollow portion and being separated from the first partition wall in the axial direction;

a first side valve chamber that is defined in the hollow portion between the first partition wall and the partitioning member, and communicates with the first chamber;

a second liquid chamber that is defined in the hollow portion between the first partition wall and the second partition wall, and communicates with the liquid chamber;

a second side valve chamber that is defined in the hollow portion by the second partition wall, and communicates with the second chamber;

a first side port provided in the first partition wall and connecting the first side valve chamber to the second liquid chamber;

a second side port provided in the second partition wall and connecting the second side valve chamber to the second liquid chamber;

a first side damping valve capable of opening and closing the first side port;

a second side damping valve capable of opening and closing the second side port;

a holder member that holds the rod and closes the second side valve chamber; and an outer peripheral screw nut that is screwed to an inner periphery of the hollow portion and fixes the holder member to the hollow portion, wherein the first side damping valve and the second side damping valve are annular leaf valves that are attached to an outer periphery of a rod penetrating the first partition wall and the second partition wall, and are fixed to the first partition wall and the second partition wall, respectively, a step portion is provided on the inner periphery of the hollow portion, the holder member includes
  an annular portion attached to the outer periphery of the rod, and
  a fitting portion provided on an outer periphery of the annular portion and fitted to the hollow portion, the outer peripheral screw nut sandwiches the fitting portion of the holder member together with the step portion such that the fitting portion is fixed to the hollow portion, and the hollow portion opens onto at least one end of the shaft, and one of the side panels covers the end of the shaft and forms, together with the holder member, an auxiliary liquid chamber that communicates with the liquid chamber.

6. The rotary damper as defined in claim 5, wherein one of the side panels includes a fluid injection port which communicates with the auxiliary liquid chamber and through which a fluid is injectable into the liquid chamber, the second liquid chamber, the first chamber, and the second chamber.

\* \* \* \* \*